United States Patent

[11] 3,588,035

| [72] | Inventor | Joseph Lewis Bloom<br>Baie D'Urfe, Quebec, Canada |
|---|---|---|
| [21] | Appl. No. | 783,010 |
| [22] | Filed | Dec. 11, 1968 |
| [45] | Patented | June 28, 1971 |
| [73] | Assignee | Joseph Lucas (Industries) Limited<br>Birmingham, England |

[54] LIQUID FUEL CONTROL APPARATUS FOR GAS TURBINE ENGINES
4 Claims, 1 Drawing Fig.

[52] U.S. Cl. ................................................. 251/61,
60/39.28
[51] Int. Cl. .............................................. F16k31/165
[50] Field of Search ........................................... 251/61, 62;
60/39.28; 92/34, 90; 137/510; 415/17, 47

[56] References Cited
UNITED STATES PATENTS
2,580,866  1/1952  Waterman .................. 251/61X

| 3,063,239 | 11/1962 | Jensen ........................ | 60/39.28 |
| 3,091,925 | 6/1963 | May ............................. | 60/39.28 |
| 3,275,286 | 9/1966 | Wood .......................... | 251/61X |

Primary Examiner—Clarence R. Gordon
Attorney—Holman & Stern

ABSTRACT: Apparatus for controlling fuel supply to a gas turbine engine comprising a body defining first and second chambers, an inner apertured tube extending through the first chamber, the axial position of the tube determining the flow of fuel to the engine, pressure responsive means in the second chamber in the body, lever means pivotally connected at one end to the pressure responsive means and at the other end to the inner tube, within the first chamber, the lever means being pivotally mounted intermediate its ends to the body, and a tubular flexible member surrounding a part of the lever means forming a seal between the body and the lever means to prevent flow of fluid between the first and second chambers in the body.

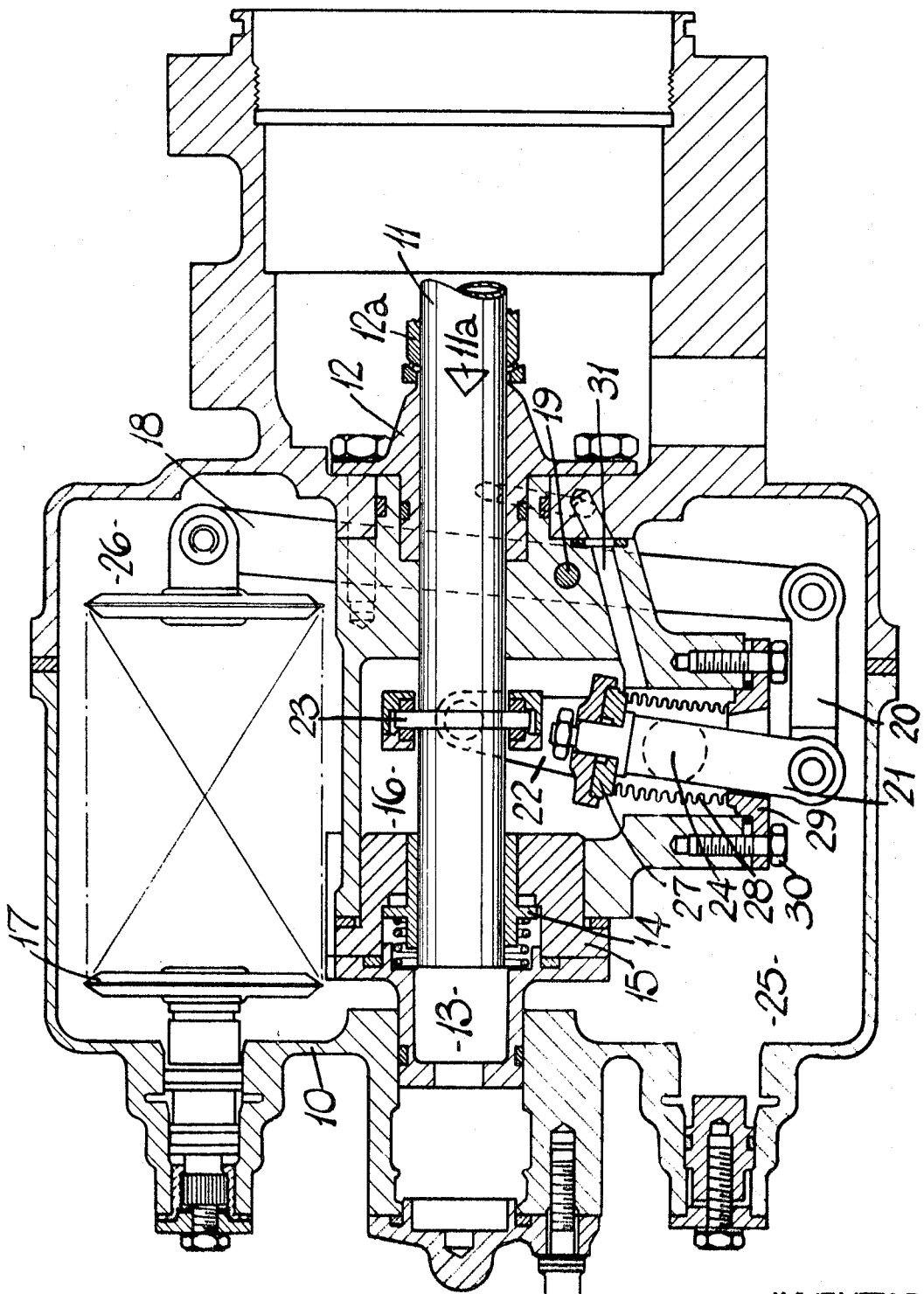

LIQUID FUEL CONTROL APPARATUS FOR GAS TURBINE ENGINES

This invention relates to apparatus for controlling the supply of liquid fuel to a gas turbine engine, the apparatus being of the kind including a cylindrical inner tube having at least one aperture in its wall, through which liquid fuel must flow to the engine, a coaxial outer sleeve within which the tube is axially slidable, to vary the area of the aperture which is exposed for the flow of fuel beyond the edge of the outer sleeve, and pressure responsive means for moving the inner tube axially with respect to the outer sleeve in response to changes in one or more air pressures derived from the engine.

The object of the invention is to provide apparatus of the kind specified in a convenient form.

In accordance with the present invention, there is provided apparatus for controlling the supply of fuel to a gas turbine engine comprising a body defining first and second chambers divided by a wall in the body, an inner tube extending through the first chamber, the first chamber in use containing fuel the inner tube having at least one aperture through which fuel must flow to the engine, an outer sleeve surrounding the inner tube, the relative axial positions of the inner tube and outer sleeve determining the area of the aperture available for flow of fuel, pressure responsive means in the second chamber in the body, lever means extending through the wall in the body, the lever means being pivotally mounted intermediate its ends in the body, one end of the lever means being connected to the pressure responsive means, and the other end being connected to the inner tube, intermediate its ends, a flexible tubular member surrounding part of the lever means, one end of the flexible tubular member being connected to the lever means and the other end being connected to the wall in the body, so that flow of fluid between the first and second chambers in the body is prevented.

The invention will now be described by way of example with reference to the accompanying drawing which illustrates a portion of the fuel control apparatus incorporating the present invention.

The apparatus illustrated is used in controlling the flow of fuel to a gas turbine engine, and has a composite body 10 within which is slidably mounted an inner tube 11. The inner tube 11 has at least one triangular aperture 11a through which fuel flowing from a pump (not shown) to the engine must flow. Surrounding the tube 11 is a fixed outer sleeve 12 within which the inner tube 11 is axially slidable, and the arrangement is such that the axial position of the tube 11 with respect to the fixed sleeve 12, as well as with respect to a further movable outer sleeve 12a, determines the area of the aperture or apertures available for the flow of fuel.

The interior of the inner tube 11 is subjected to the pressure of fuel at relatively high pressure. The body defines, at one end of the inner tube 11, a cavity 13 which is therefore also subjected to high pressure fuel. The opposite end of the inner tube 11 (not illustrated) is also subjected to fuel at the same pressure, so that the tube is hydraulically balanced within the apparatus.

Surrounding the inner tube 11 at its end adjacent to the cavity 13 is a seal assembly 14 mounted in a collar 15 secured in the body 10, the collar 15 and the seal assembly 14 separating the cavity 13 from a first chamber 16 defined within the body 10. The inner tube extends through this chamber 16. The seal assembly 14 is, however, of the kind in which limited leakage of fuel can take place from the cavity 13 into the chamber 16.

For moving the inner tube 11 axially within the body 10, and relatively to the sleeves 12 and 12a, there is a pressure responsive means comprising an evacuated capsule 17 mounted within a portion of a second chamber 26 in the body 10, one end of the capsule 17 being fixed to the body, and the other end being pivotally connected to a pair of links 18. The links 18 pass at opposite sides of the portion of the body 10 in which the inner tube 11 is slidable mounted. These links 18 are pivotally mounted intermediate their ends to the body by means of a pin 19. The opposite ends of the links 18 are pivotally connected to a further link 20, the opposite end of which is connected to a link comprising a lever 21, and an H-shaped member 22. The lever 21 is secured, at its end remote from the connection with the link 20, to the bridge piece of the H-shaped member 22. The pair of limbs of the H-shaped member 22 at one end, are pivotally connected at opposite sides respectively of the inner tube 11 intermediate its ends and within the first chamber 16. The connection is by means of a collar 23 secured on the inner tube 11. The limbs at the opposite end of the member 22 are pivotally mounted upon the body at opposite sides of the lever 21 respectively by means of trunnions. The common axes of these trunnions are indicated at 24.

The end of the lever 21 which is connected to the link 20, extends into a further portion 25 of the second chamber in the body 10, which is in open communication with the chamber portion 26 containing the capsule 17. Air under pressure is admitted through an inlet (not illustrated) into the second chamber 25, 26.

Alteration of the length of the capsule 17 causes a change in the axial position of the inner tube 11 through the links 18 and 20, and the link comprising the lever 21 and H-shaped member 22.

The position of the pivot pin 19 for the links 18 is so chosen that the movement of the end of the capsule 17 which is connected to the links 18, is equal to the movement of the inner tube 11.

Clamped between the lever 21 and the H-shaped member 22 is a ring 27, to which is secured one end of a flexible tubular member in the form of a bellows 28. The other end of the bellows 28 is secured to a ring 29 mounted the body 10 by means of screws 30. The connections at the ends of the bellows 28 are fluidtight.

The bellows surrounds the lever 21 so as to prevent flow of liquid fuel contained in the first chamber 16 to the interior of the second chamber 25, 26 and also therefore prevents flow of air from the second chamber 25, 26 into the first chamber 16.

The pressure of fuel in the first chamber 16 is substantially lower than that in the cavity 13, due to the pressure drop created by the seal assembly 14. There is, furthermore, a drain outlet passage 31 formed in the body 10, communicating with the first chamber 16.

It is to be understood that the pressure of air in the second chamber 25, 26 may be directly derived from the engine compressor stage, or alternatively, may be a function thereof as required. The interior of the capsule 17 may be evacuated or may have applied thereto a further air pressure derived from the engine.

Having thus described my invention what I claim as new and desire to secure by Letters Patent is:

I claim:

1. Apparatus for controlling the supply of fuel to a gas turbine engine comprising a body defining first and second chambers divided by a wall in the body, an inner tube extending through the first chamber, the first chamber in use containing fuel the inner tube having at least one aperture through which fuel must flow to the engine, an outer sleeve surrounding the inner tube, the relative axial positions of the inner tube and outer sleeve determining the area of the aperture available for flow of fuel, pressure responsive means in the second chamber in the body, lever means extending through the wall in the body, the lever means being pivotally mounted intermediate its ends in the body, one end of the lever means being connected to the pressure responsive means, and the other end being connected to the inner tube, intermediate its ends, a flexible tubular member surrounding part of the lever means, one end of the flexible tubular member being connected to the lever means and the other end being connected to the wall in the body, so that flow of fluid between the first and second chambers in the body is prevented.

2. Apparatus as claimed in claim 1 in which the lever means comprises a first link connected at one end to the pressure responsive means and pivotally mounted intermediate its ends in the body, a second link connected at one end to the inner tube and also pivotally mounted intermediate its ends in the body, and a further link connecting the opposite ends of the first and second links together, the second link passing through an opening in the wall in the body.

3. Apparatus as claimed in claim 1 in which the flexible tubular member is a bellows.

4. Apparatus as claimed in claim 1 in which the lever means is pivotally connected to the inner tube by a collar secured to the inner tube within the first chamber and intermediate the ends of the inner tube.